Feb. 2, 1965   L. HARRISON ETAL   3,168,413
METHOD OF AND MACHINE FOR MAKING USED BRICKS
Filed Dec. 4, 1961   2 Sheets-Sheet 1
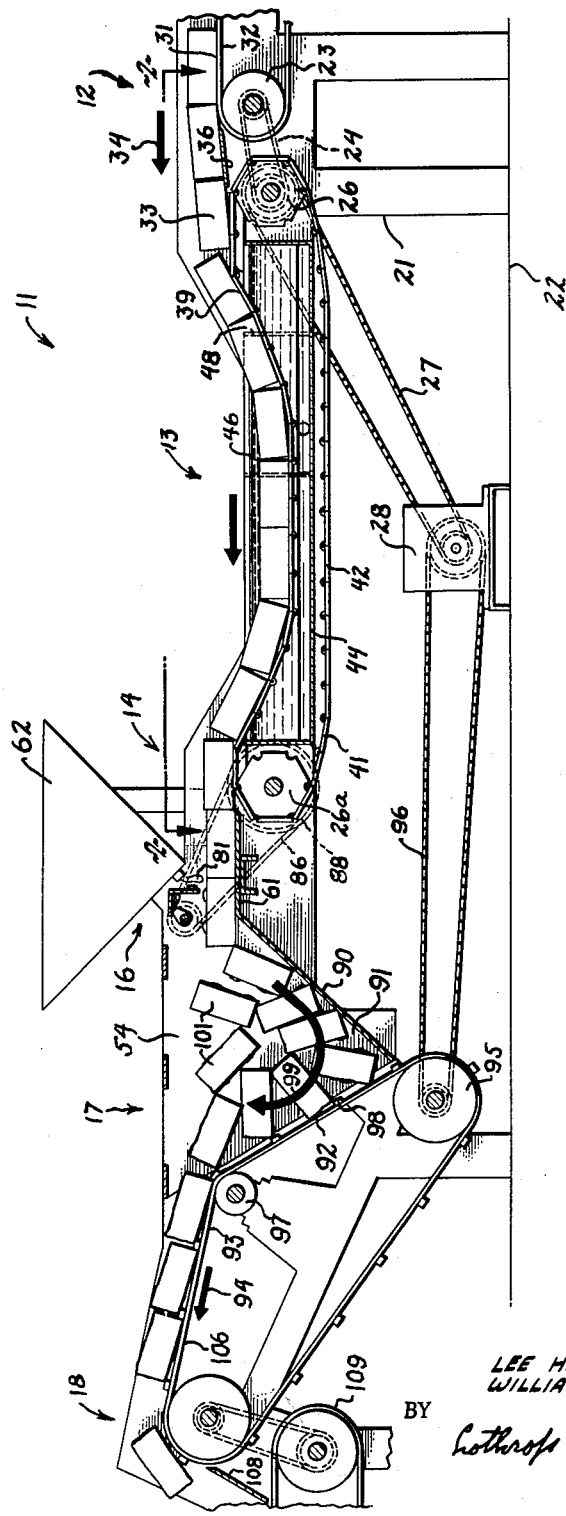
INVENTORS
LEE HARRISON
WILLIAM R. O'LEARY, JR.
BY
Lothrop & West
ATTORNEYS

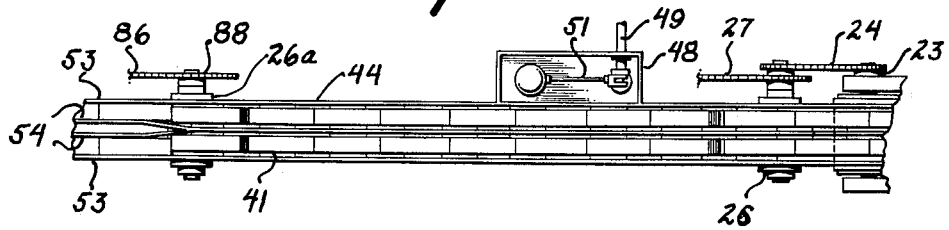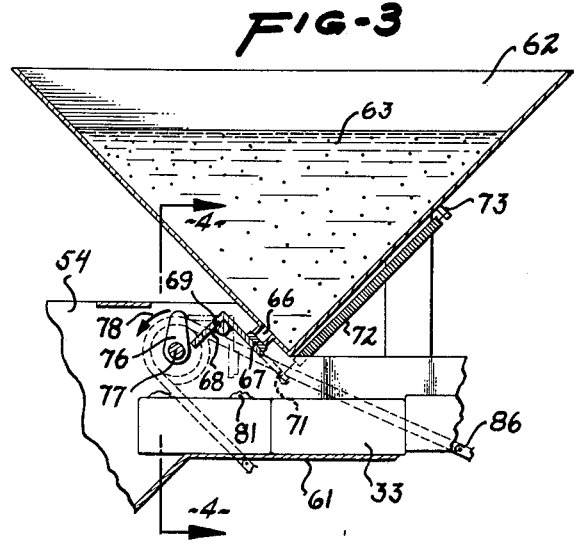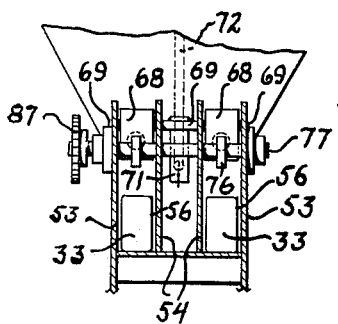

United States Patent Office 3,168,413
Patented Feb. 2, 1965

3,168,413
METHOD OF AND MACHINE FOR MAKING USED BRICKS
Lee Harrison, 1280 8th Ave., and William R. O'Leary, Jr., 1286 Noonan Drive, both of Sacramento, Calif.
Filed Dec. 4, 1961, Ser. No. 156,610
5 Claims. (Cl. 117—62)

The invention relates to machines for giving new bricks an aged or used appearance.

The attractive appearance of used, or second-hand, bricks has created such a great demand for them that the supply is inadequate. There are not enough old brick buildings, fireplaces and walls being torn down to keep up with the public's requirements for used bricks.

Numerous attempts have been made to prepare new bricks in a way that will cause the new bricks to simulate used bricks. By and large, these efforts have been attended by only a moderate degree of success. Either the operations have been so costly as to price the item out of all but the most exclusive markets, or, and as has generally been the case, the product's appearance is either far removed from that of used brick or is so uniform, artificial and contrived as to render it entirely unacceptable as a substitute.

It is therefore an object of the invention to provide a brick treating machine which yields a product having an appearance substantially indistinguishable from that of used brick.

It is another object of the invention to provide a brick treating machine which produces bricks which are individualistic in appearance and which therefore provide the same desirable random arrangement as is found in used bricks.

It is still another object of the invention to provide a high-volume, straight-line, production machine, as distinguished from the batch type of operation heretofore used.

It is a further object of the invention to provide a used brick machine which, when "on stream" requires but a minimum of attention and which can be handled by relatively unskilled personnel.

It is yet a further object of the invention to provide a machine for making used bricks which occupies but a relatively small amount of space, and which can readily be integrated into the operations of any brick manufacturer.

It is a still further object of the invention to provide a machine for treating bricks which furnishes a high yield with but a minimum of breakage.

It is another object of the invention to provide a generally improved machine for making used bricks.

Other objects, together with the foregoing are attained in the embodiment described in the following description and shown in the accompanying drawings in which:

FIGURE 1 is a side elevational view, with portions of the structure being shown in section;

FIGURE 2 is a plan view of the dipping tank and liquid level control mechanism;

FIGURE 3 is a vertical section, to an enlarged scale, taken through the hopper and the mortar dispensing valve structure; and FIGURE 4 is a section, the plane of the section being indicated by the line 4—4 in FIGURE 3.

While the machine of the invention is susceptible of numerous physical embodiments, depending upon the environment and requirements of use, a machine of the form shown has been exhaustively tested and used, and has performed, pursuant to the method of the invention, in an eminently satisfactory manner.

The used brick machine, generally designated by the reference numeral 11, includes (see FIGURE 1), successively, a feeder station 12, a dipping station 13, a draining station 14, a mortar dispensing station 16, a tumbling and flaking station 17, and an off-bearing station 18.

The feeder station 12 includes a framework 21 supported on a floor 22 and a live pulley 23 driven by a V-belt 24 engaging a rotatable wheel 26 which is itself driven by a V-belt 27, or chain, coming from a prime mover 28, such as an internal combustion engine. The upper run 31 of a feeder belt 32 reaved about the pulley 23 serves to feed new bricks 33 in the direction indicated by the arrow 34.

A plate 36, substantially tangent to the tops of the pulley 23 and the wheel 26, serves as a transition supporting member as the new bricks are urged off the feeder belt and onto the upper run 39 of a dipper belt 41, the lower run 42 returning under a dipping tank 44 containing a dark-brown, water solution of Bitumel, a commercial emulsified asphalt, the liquid being indicated by the numeral 46.

As appears most clearly in FIGURE 1 the dipper belt 41 is of a type known as a tray belt, or table belt, and comprises a plurality of flat plates linked or hinged together so as to form a substantially continuous, uninterrupted surface throughout its upper and lower runs. The dipper belt 41 is provided with cogs engageable with recesses in the drive wheel 26. Consequently, the dipper belt 41 also serves positively to drive a corresponding wheel 26a located beyond the opposite end of the dipping tank. The link belt 41 is initially installed with an excess of links on the upper run so that the upper run droops or sags into the tank solution, concurrently submerging the superposed bricks.

As appears most clearly in FIGURE 2, the dipping tank 44 has mounted thereon a solution feed tank 48 into which is fed, by a pipe 49 leading from a solution storage tank (not shown), sufficient solution to make up for the quantity absorbed by the bricks. A float valve 51 keeps the liquid level constant in the feed tank 48 and openings in the common wall between the feed tank 48 and the dipping tank provide communication therebetween.

FIGURE 2 points out with especial clarity the fact that in the embodiment shown the production line is doubled, each of the lines being parallel and side by side. A multiplicity of similar parallel production lines could, of course, be utilized. Since each of the production lines is substantially identical, however, it is believed that a description of one will serve equally to describe the other.

The dimensions of the members are such that the distance between the outer wall 53 and the inner wall 54 (see FIGURES 2 and 4) is slightly in excess of the thickness of a common brick. Consequently, from one end of the production line to the other, the bricks are constrained to remain in the attitude shown, namely, with the large side faces 56 of the bricks in a vertical attitude (see, for example, FIGURE 4).

Thus, as the bricks emerge from the dipping tank, they are supported on the same edge as that on which they were fed from the feeder belt.

As the bricks emerge, they are dripping wet from the tar or asphalt water solution and have lost their typically new brick red color. Instead, they show the darkening or browning effect of the emulsified asphalt.

Upon leaving the solution, the outer surfaces of the bricks, now a reddish-brown color and giving an appearance of aged or weathered bricks, commence to dry.

From the dipper belt, the drying bricks move to the mortar dispensing station.

From the brick drying station (only a partial drying actually occurring), the bricks are urged onto a platform 61 located beneath a hopper 62 having stored therein, and replenished from time to time, a well-mixed mortar slurry 63 of medium consistency.

Mechanism is provided for discharging from the hopper a measured quantity of mortar at timed intervals through a pipe-shaped spout 66 located adjacent the bottom of the hopper. A valve seat 67 covers the spout in a base or initial position and uncovers the spout in a second or terminal position, indicated in outline in FIGURE 1.

The valve seat 67 is mounted on one leg of an angle iron rocker 68 welded at its inner corner to a cross-rod 69 extending transversely across and rotatable mounted on the outermost vertical boundary plates 53 (see FIGURE 4). Also welded to the cross-rod 69 and sloping downwardly to terminate below the lowermost portion of the hopper is an extension member 71 on the extremity of which is secured one end of a tension spring 72, the other end the spring being anchored to a stud 73 mounted on the up-stream or up-line side of the hopper.

The angle-iron rocker 68 is biased by the spring in a direction such that the spout 66 is normally closed by the valve-seat 67. Angular motion of the angle iron rocker and the valve seat to the location shown in outline in FIGURE 3 is effected by a cam 76 mounted on a transverse shaft 77 rotated in the direction indicated by the arrow 78. As the cam 76 swings upwardly into abutment with the interfering leg of the rocker 68, the biasing force of the spring 72 is overcome and the valve seat 67 is swung away momentarily from the spout and a globule or slug 81 of mortar drops downwardly on the upper edge surface of the subjacent brick (see FIGURES 1 and 3 illustrating this operation). The dwell time of the cam 76, during which period the spout is open, is a function both of dimensions and of the speed of rotation of the cam. The latter value is determined by the speed of a drive chain 86 in engagement with a sprocket 87 on the shaft 77 (see FIGURE 4), the chain 86 being driven by a sprocket 88 coaxially mounted on the shaft carrying the dipper belt pulley 26a (see FIGURE 1). In other words, the speeds of the various components of the machine are keyed or linked together so that production continues at a consistent rate throughout the device.

As appears most clearly in FIGURES 1 and 3, it has been found that a pair of globs 81 deposited on each of the bricks provides a very satisfactory result.

Upon leaving the mortar deposition station the leading brick having two globules or gobbets of mortar on its upper edge, drops downwardly (see FIGURE 1), falling on an inclined wall 90 defining the up-stream or up-line boundary of a triangular shaped chamber 91 having its apex pointed downwardly.

The opposite or downline boundary of the chamber 91 is defined by a steeply inclined run 92 of a cleated belt 93 moving in the direction indicated by the arrow 94 and driven by a pulley 95 rotated by the prime mover 28 through a chain 96. An adjustable idler 97 provides the steepness of the cleated belt run 92 and determines the belt tension.

Within the chamber 91, termed the tumbling and the flaking or chipping chamber, a plurality of bricks is allowed to accumulate, each of the bricks having previously been daubed with a pair of mortar gobbets 81.

The action of the cleated belt run 92 on the bricks in the chamber 91 is illustrated most clearly in FIGURE 1. As can be seen, the ends and the edges of the bricks are, by gravity, brought into engagement with the upwardly moving cleats 98, the effect being to tilt the engaged bricks upwardly and over, causing them to tumble and abrade or rub against the ends and the edges of the adjacent bricks. As shown by the arrow 99, the general, over-all path or movement of each brick is down the wall 90 and up the cleated belt. During the brick's passage along the path, however, repeated tumbling of the brick occurs, the result being that the mortar gobs are smeared in a casual, random and dissimilar fashion over the brick ends and edges.

It is to be noted again, that the transverse dimension of the tumbling chamber is but slightly in excess of a brick's thickness. Consequently, only the ends and edges of the bricks rub against each other, the sides of the brick are not smeared since the sides always face toward the adjacent vertical boundary walls 53 and 54. Since the side face of a brick is seldom, if ever exposed, in a brick construction, such as a building or a wall, it is not necessary to smear the sides with mortar to provide the used brick appearance. The instant device, therefore, saves on the amount of mortar used by not applying mortar on the sides, as has been the case with other machines previously used.

The size of the cleats and the angle and tension of the belt run 92 are selected so that many of the bricks that come into engagement with the belt are tipped back over into the position indicated by the bricks designated 101 and are thus caused to recirculate along the path 99. These variables, on the other hand, are chosen so that the same number of bricks are removed from the tumbling chamber by the cleated belt and carried along the belt run 106, as enter the chamber.

In addition to the random, mortar smearing action, the tumbling provides another desirable result. This is a flaking or chipping action resulting from the random impacts of one brick against another. The corners of some of the bricks are rounded and, on others, shards are flaked off, lending to the end product a very real resemblance to used brick.

From the upper run 106 the treated brick is dropped to slide down a guide plate 108 onto an off-bearing belt 109 which carries the brick to a suitable location for stacking and drying.

It can therefore be seen that we have provided a high volume efficient machine and method of treating new bricks so as to cause them to simulate the appearance of used bricks.

What is claimed is:

1. A method of treating new bricks to simulate the appearance of used bricks, said method comprising the steps of: submerging new bricks in an emulsified asphalt solution; withdrawing the bricks from said solution; allowing the withdrawn bricks to drain; applying a globule of mortar to one surface of each of the bricks; of tumbling a plurality of the bricks so that said one surface is caused to rub against the surfaces of other bricks; of removing the tumbled bricks; and of drying and stacking the bricks so removed.

2. A method of treating new bricks to simulate the appearance of used bricks, said method comprising the steps of:
   (a) submerging new bricks in a colored emulsified asphalt solution;
   (b) withdrawing the colored bricks from said solution;
   (c) applying mortar to a surface of each of the bricks;
   (d) tumbling a plurality of the bricks so that said surface is rubbed against the surfaces of other bricks;
   (e) removing the colored and tumbled bricks; and
   (f) drying and stacking the bricks so removed.

3. A used brick machine comprising:
   (a) an elongated framework;
   (b) an elongated fluid holding tank mounted on said framework;
   (c) a conveyor belt including an upper run movable from one end of said tank toward the other end, said upper run being capable of supporting a plurality of bricks and including a central sagging portion adapted to submerge the bricks on said central portion in the fluid in said tank;
   (d) a plate on said framework adjacent said other end of said tank to receive and support bricks emergent from said tank;
   (e) a hopper on said framework above said plate, said hopper including an opening adjacent the bottom end thereof capable of discharging mortar from said hopper onto subjacent bricks on said plate;
   (f) timed valve means on said framework adjacent said hopper for opening and closing said hopper opening in dependence upon the speed of said belt;

(g) a brick-tumbling bin mounted on said framework adjacent and below said plate for receiving bricks discharging from said plate, said bin having an open end; and, (h) an upwardly inclined and movable cleated belt covering said open end of said bin and being capable of engaging with and removing bricks from said bin.

4. A machine for treating a continuous, moving line of bricks comprising:

(a) an elongated framework extending from an input end to an output end;

(b) an elongated fluid-containing dipping tank on said framework;

(c) a first conveyor mounted on said framework and movable from said input end toward said output end in vertical alignment with said tank, the path of said conveyor including a portion located below the fluid level in said tank;

(d) a brick supporting member on said framework adjacent the discharge end of said conveyor;

(e) means on said framework adjacent said supporting member for depositing a predetermined quantity of mortar onto bricks located on said supporting member and emergent from said dipping tank;

(f) means on said framework adjacent the output end of said brick-supporting member for tumbling bricks discharged from said supporting member; and (g) a second conveyor mounted on said framework adjacent to and movable away from said tumbling means toward said output end of said framework for removing bricks from said tumbling means.

5. The machine of claim 4 wherein said tumbling means includes an inverted triangular shaped bin having a transverse width slightly in excess of the thickness of a brick, said bin including an inclined end wall adjacent the discharge end of said brick-supporting member to receive and support bricks discharged therefrom, said tumbling means further including an inclined belt covering the opposite end of said bin, said belt being upwardly movable and capable of lifting bricks toward said second conveyor.

References Cited by the Examiner
UNITED STATES PATENTS

| | | | |
|---|---|---|---|
| 328,551 | 10/85 | Ward | 25—2 |
| 3,043,040 | 7/62 | Silva | 25—2 |

RICHARD D. NEVIUS, *Primary Examiner.*

R. F. WHITE, *Examiner.*